(12) United States Patent
Chen et al.

(10) Patent No.: US 10,584,802 B2
(45) Date of Patent: Mar. 10, 2020

(54) VALVE CORE FOR AN ELECTRONIC VALVE

(71) Applicant: CONTINENTAL AUTOMOTIVE GMBH, Hannover (DE)

(72) Inventors: Jiaqiang Chen, Wuhu (CN); Xiangguang Cao, Wuhu (CN); Guangrui Sun, Wuhu (CN); Baiping Wang, Wuhu (CN); Russell M Modien, Chatham (CA)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/437,579

(22) Filed: Feb. 21, 2017

(65) Prior Publication Data

US 2017/0159842 A1 Jun. 8, 2017

Related U.S. Application Data

(63) Continuation of application No. PCT/EP2015/068292, filed on Aug. 7, 2015.

(30) Foreign Application Priority Data

Aug. 21, 2014 (CN) .......................... 2014 1 0414829
Aug. 21, 2014 (CN) ...................... 2014 2 0474139 U

(51) Int. Cl.
*F16K 31/06* (2006.01)
*F02B 37/16* (2006.01)

(52) U.S. Cl.
CPC .......... *F16K 31/0648* (2013.01); *F02B 37/16* (2013.01); *F16K 31/0655* (2013.01); *F16K 31/0675* (2013.01)

(58) Field of Classification Search
CPC ............. F16K 31/0624; F16K 31/0644; F16K 31/0648; F16K 31/0651; F16K 31/0655;
(Continued)

(56) References Cited

U.S. PATENT DOCUMENTS 4,475,711 A * 10/1984 Rountry .............. F16K 31/0655
251/129.15
4,520,420 A * 5/1985 Ariyoshi ................. F02D 41/20
123/490
(Continued)

FOREIGN PATENT DOCUMENTS

CN 203009035 U 6/2013
CN 204200358 U 3/2015
(Continued)

OTHER PUBLICATIONS

International Search Report and Written Opinion dated Oct. 15, 2015 from corresponding International Patent Application No. PCT/EP2015/068292.
(Continued)

*Primary Examiner* — Eric Keasel

(57) ABSTRACT

A valve core for an electronic valve, which includes a valve head, and an armature. The valve head and the armature being connected to each other by means of a guide rod. The valve core is part of an electronic valve. The valve head and armature are connected by means of the guide rod, which reduces the cost for manufacturing the armature. The electronic valve includes an upper stator and a lower stator, an upper bearing and a lower bearing for guiding the guide rod, an elastic component for biasing the valve head, a sleeve surrounding the periphery of the armature, a bobbin which at least partially surrounds the sleeve, and a coil wound on the bobbin. The electronic valve of the present invention may be used as a compressed gas bypass valve of a turbocharged engine.

12 Claims, 11 Drawing Sheets

(58) Field of Classification Search
CPC ............ F16K 31/0675; F16K 31/0686; F16K 31/0696; F16K 31/10; F16K 31/82; F02B 37/16
USPC ........................................ 251/129.15, 129.19
See application file for complete search history.

(56) References Cited

U.S. PATENT DOCUMENTS

| | | | |
|---|---|---|---|
| 4,621,788 A * | 11/1986 | DeLew | F16K 31/0651 251/120 |
| 4,769,562 A | 9/1988 | Ghisio | |
| 6,000,667 A | 12/1999 | Isbell et al. | |
| 6,681,746 B1 * | 1/2004 | Cook | F02M 25/0836 123/516 |
| 6,959,718 B2 * | 11/2005 | Kayahara | F16K 1/36 137/15.01 |
| 7,971,601 B2 * | 7/2011 | Lum | F16K 31/002 137/337 |
| 2005/0218362 A1 * | 10/2005 | Furuta | F16K 11/0716 251/129.15 |
| 2011/0175004 A1 | 7/2011 | Duerr et al. | |
| 2013/0248021 A1 | 9/2013 | Foerster | |
| 2014/0084195 A1 | 3/2014 | Hakoda et al. | |
| 2015/0267837 A1 * | 9/2015 | Vandenplas | F16K 39/024 251/129.07 |

FOREIGN PATENT DOCUMENTS

| | | |
|---|---|---|
| DE | 102012224144 B3 | 5/2014 |
| DE | 102012224131 B3 | 6/2014 |
| JP | S56-115073 A | 9/1981 |
| JP | S56115073 U | 9/1981 |
| JP | S63-42220 A | 2/1988 |
| JP | H11-287348 A | 10/1999 |
| JP | 2014047800 A | 3/2014 |
| KR | 100989042 B1 | 10/2010 |
| WO | 2014068765 A1 | 5/2014 |
| WO | 2014102133 A1 | 7/2014 |

OTHER PUBLICATIONS

English Translation of Abstract of JPH11-287348A.
Chinese Office Action dated Feb. 22, 2019 for corresponding Chinese Patent Application No. 201410414829.6.

* cited by examiner

VALVE CORE FOR AN ELECTRONIC VALVE

CROSS-REFERENCE TO RELATED APPLICATIONS

This application claims the benefit of PCT Application PCT/EP2015/068292, filed Aug. 7, 2015, which claims priority to Chinese Application 201410414829.6, filed Aug. 21, 2014, and Chinese Application 201420474139.5, filed Aug. 21, 2014. The disclosures of the above applications are incorporated herein by reference.

FIELD OF THE INVENTION

The present invention relates to the field of machinery, in particular to a valve core for an electronic valve, and an electronic valve comprising the valve core.

BACKGROUND OF THE INVENTION

At present, large numbers of vacuum valves are used in the technical field of motor vehicles. These vacuum valves have drawbacks, in that they are not only of large size, but also have a complex structure on account of needing accessories such as vacuum pipelines and valve gates. Compared with vacuum valves, electronic valves have the advantage on account of having a relatively simple structure and a smaller size. However, in the prior art, in order to use an armature to drive a valve head to move, the valve head and armature are generally connected directly; thus, requirements on processing features such as shape of the armature are higher, increasing the armature processing costs.

SUMMARY OF THE INVENTION

The problem solved by the present invention is to provide a valve core for an electronic valve, and an electronic valve comprising the valve core; the valve core and electronic valve of the present invention are simple in structure and save costs.

The present invention provides a valve core for an electronic valve, the valve core including a valve head, an armature, the valve head and the armature being connected to each other by means of a guide rod.

The present invention also provides an electronic valve, comprising the valve core provided by the present invention, the electronic valve includes an upper stator and a lower stator, an upper bearing and a lower bearing for guiding the guide rod, an elastic component for biasing the valve head, a sleeve surrounding the periphery of the armature, a bobbin which at least partially surrounds the sleeve, and a coil wound on the bobbin.

The electronic valve of the present invention may be used as a compressed gas bypass valve of a turbocharged engine.

The valve core and electronic valve of the present invention have the following advantages: in the valve core and electronic valve of the present invention, since the valve head and armature are connected by means of the guide rod, with no need for the valve head and armature to be connected directly, the requirements on processing features such as shape of the armature are lowered, thereby lowering armature processing costs.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A valve core for an electronic valve and an electronic valve including the valve core according to embodiments of the present invention are described below with reference to the accompanying drawings. In the following description, many specific details are expounded in order to give those skilled in the art a more comprehensive understanding of the present invention. Furthermore, it should be understood that the present invention is not limited to the specific embodiments presented. On the contrary, it would be acceptable to use an arbitrary combination of the features and key elements below to implement the present invention, regardless of whether they relate to different embodiments. Thus, the aspects, features, embodiments and advantages below serve only illustrative purposes, and should not be regarded as key elements or limitations of the claims, unless clearly mentioned in the claims.

Turbocharged engines, i.e. engines with turbochargers, are being used in ever increasing quantities in modern motor vehicles, in order to improve energy efficiency. In a turbocharged engine, exhaust gases drive a turbine (disposed in an exhaust gas pipeline) of the turbocharger, and at the same time, an air compressor connected to the turbine is used to compress incoming air. Air which has been compressed (hereinafter abbreviated as compressed air) reaches a throttle valve via a compressed air intercooler, and then enters a cylinder of the engine for combustion to take place.

Figure 1:
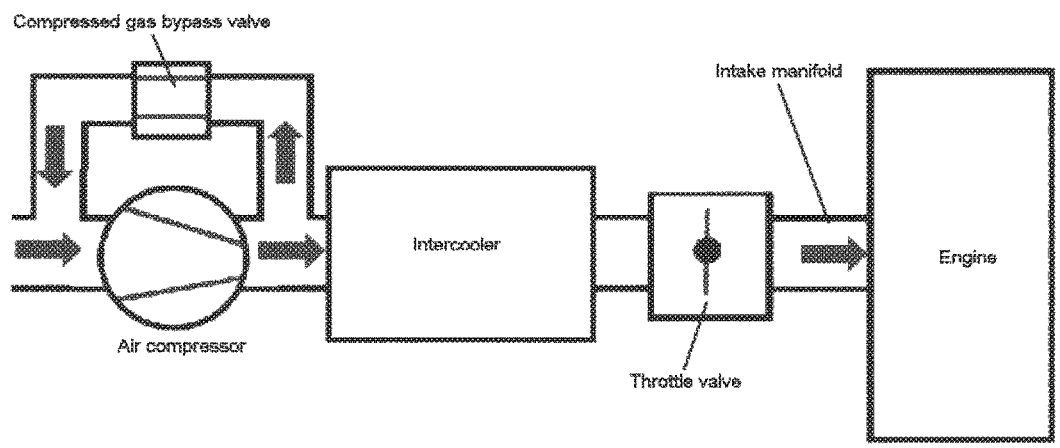
FIG. 1 shows the structure of arrangement of a compressed gas backflow pipeline of a turbocharged engine having an electronic valve according to the present invention.

FIG. 1 shows the structure of arrangement of a compressed gas backflow pipeline of a turbocharged engine having an electronic valve according to the present invention. According to the present invention, a compressed gas backflow pipeline which is connected in parallel with the air compressor is provided upstream of the compressed air intercooler, to enable compressed gas to flow back to an inlet of the air compressor from an outlet of the air compressor. Backflow of compressed gas prevents surges in gas flow, thereby preventing damage to turbine blades caused by surge flutter. Furthermore, backflow of compressed gas also allows the turbine to continue rotating so as to reduce turbine lag during acceleration and protect the throttle.

As FIG. 1 shows, an electronic valve is provided in the compressed gas backflow pipeline, wherein the electronic valve is used as a compressed gas bypass valve of the turbocharged engine. When the compressed gas bypass valve is not energized, the compressed gas bypass valve causes the backflow pipeline to be closed. In this case, compressed air enters the engine cylinder through the compressed air intercooler, the throttle and an intake manifold. When the compressed gas bypass valve is energized, the compressed gas bypass valve causes the backflow pipeline to be open, so compressed air flows back to the gas intake end of the air compressor through the compressed gas bypass valve.

Figure 2:
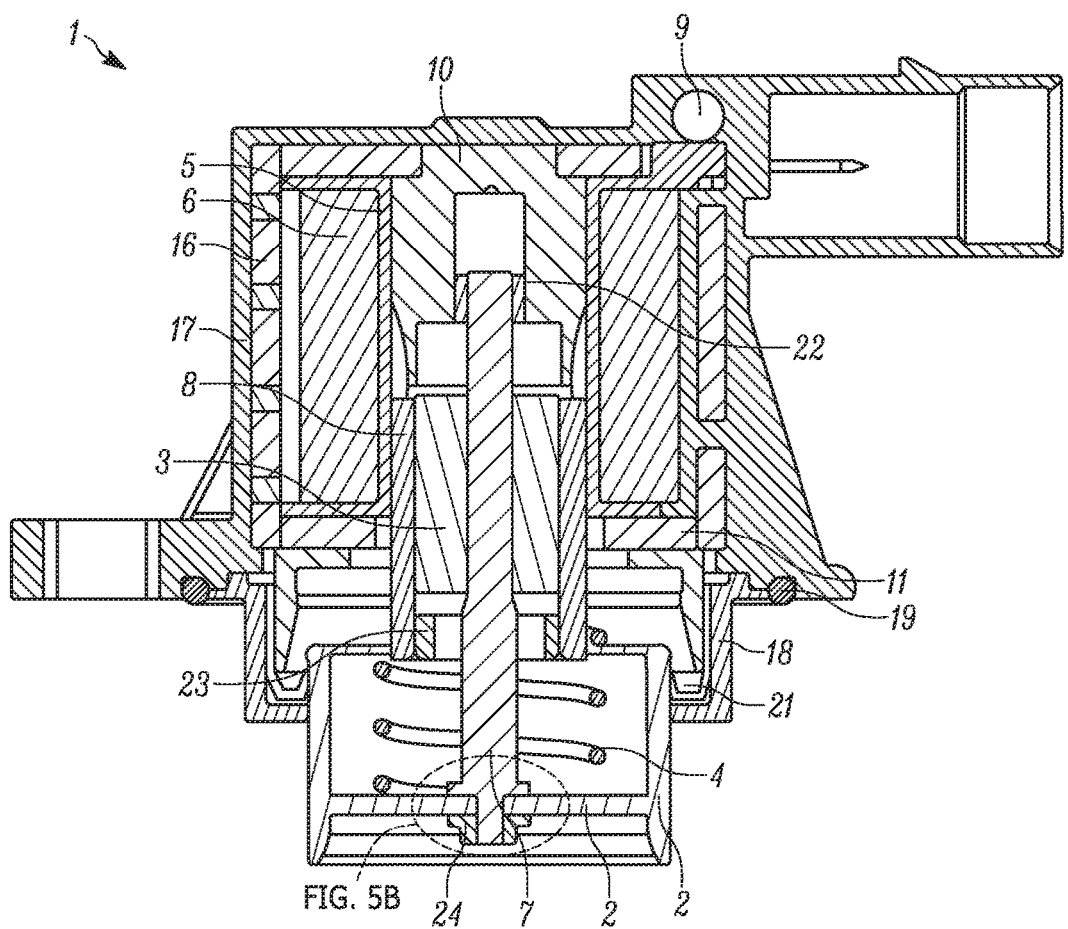
FIG. 2 shows schematically a sectional view of an electronic valve according to an embodiment of the present invention.
Figure 3:
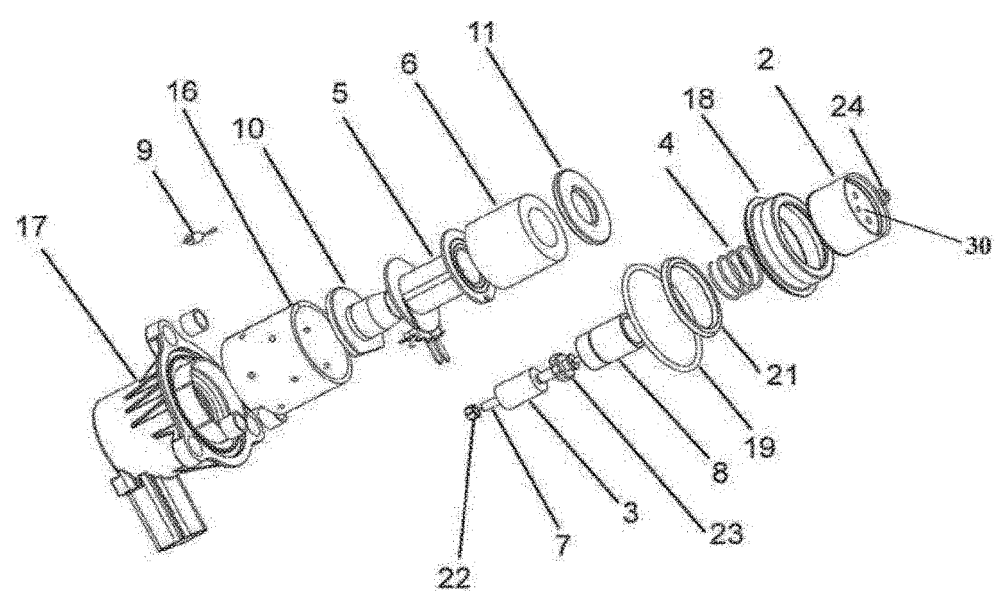
FIG. 3 shows schematically an exploded drawing of the various components of the electronic valve shown in FIG. 2.

FIGS. 2 and 3 show schematically a sectional view and an exploded component drawing, respectively, of an electronic valve according to an embodiment of the present invention, wherein the electronic valve may in particular be used as the compressed gas bypass valve shown in FIG. 1. As FIGS. 2-3 show, the electronic valve 1 includes a moveable valve core, and an elastic component 4 (such as a spring) for biasing the moveable valve core, wherein the moveable valve core includes a valve head 2, an armature 3 and a guide rod 7. In an optional embodiment, the armature 3 may be cylindrical, and the valve head 2 and armature 3 may be in direct floating connection. However, in the preferred embodiment of the present invention shown in FIGS. 2 and 3, the valve head 2 and armature 3 may be connected to each other by means of the guide rod 7. Since the valve head 2 and armature 3 are connected by means of the guide rod 7, with no need for the valve head 2 and armature 3 to be connected directly, the requirements for manufacturing features, such as shape of the armature, are reduced; for example, an ordinary cylindrical armature may be used, thereby lowering armature processing costs.

FIGS. 2 and 3 further show that the electronic valve 1 also includes multiple stators for strengthening the magnetic force of the electronic valve 1, for example an upper stator 10 disposed above the armature 3 and an annular lower stator 11 disposed around the armature 3, where each stator may be made of magnetically permeable material. The electronic valve 1 also includes an upper bearing 22 and a lower bearing 23 for guiding the guide rod 7, a sleeve 8 surrounding the periphery of the armature 3, where the sleeve 8 is mainly used for improving the electromagnetic force performance of the electronic valve and not for guiding the movement of the armature 3, i.e. the sleeve 8 need not be in contact with the armature 3, a bobbin 5 which at least partially surrounds the sleeve 8, and a coil 6 wound on the bobbin 5. The guide rod 7 moves in the upper and lower bearings; such a structure has better wear resistance. Moreover, since the guide rod 7 is guided by the bearings 22,23 so as to guide the movement of the valve head 2 and armature 3, with no need to guide the armature 3 directly by means of the sleeve for example, there is no need to subject the surface of the armature to special processing, so the requirement on armature surface quality is lowered, thereby lowering the manufacturing costs of the armature 3.

Preferably, the guide rod 7 and armature 3 are joined together by means of an interference fit, thereby fixing the armature and guide rod.

Preferably, the upper bearing 22 is in interference connection with the upper stator 10, while the lower bearing 23 is in interference connection with the sleeve 8, thereby fixing the upper bearing and lower bearing.

Preferably, the sleeve 8 may be made of magnetically permeable material, thereby significantly improving the electromagnetic force performance of the electronic valve.

Preferably, the bobbin 5 may be made by injection molding. Multiple annular ribs, preferably two annular ribs, may be provided on the bobbin 5, thereby preventing plastic from filling gaps (leading to valve failure) during injection molding of plastic.

FIGS. 2 and 3 further show that the electronic valve 1 also includes a housing 16 surrounding the coil 6, an outer encapsulating element 17 surrounding the housing 16, and a shield 18 around the valve head 2. Preferably, the housing 16 is made of magnetically permeable material in order to strengthen the magnetic force and, together with the coil 6, forms a completely closed coil structure. A sealing element for sealing, such as an O-ring 19, is provided between the outer encapsulating element 17 and the shield 18. A sealing element, such as a V-ring 21, is provided between the shield 18 and the valve head 2.

FIGS. 2 and 3 further show that the electronic valve 1 may also include an electronic component 9 for absorbing pulse energy. The provision of the electronic component 9 protects the valve body from damage by sudden changes in external voltage, e.g. pulses, etc. Furthermore, the electronic component 9 may absorb energy generated by the valve body, protecting a customer power supply end from damage. Such an electronic component for absorbing pulse energy may be a variety of electronic components known to those skilled in the art, such as a diode, and thus may impart variety to the electronic valve 1 product, so as to suit different customer requirements.

Figure 4:
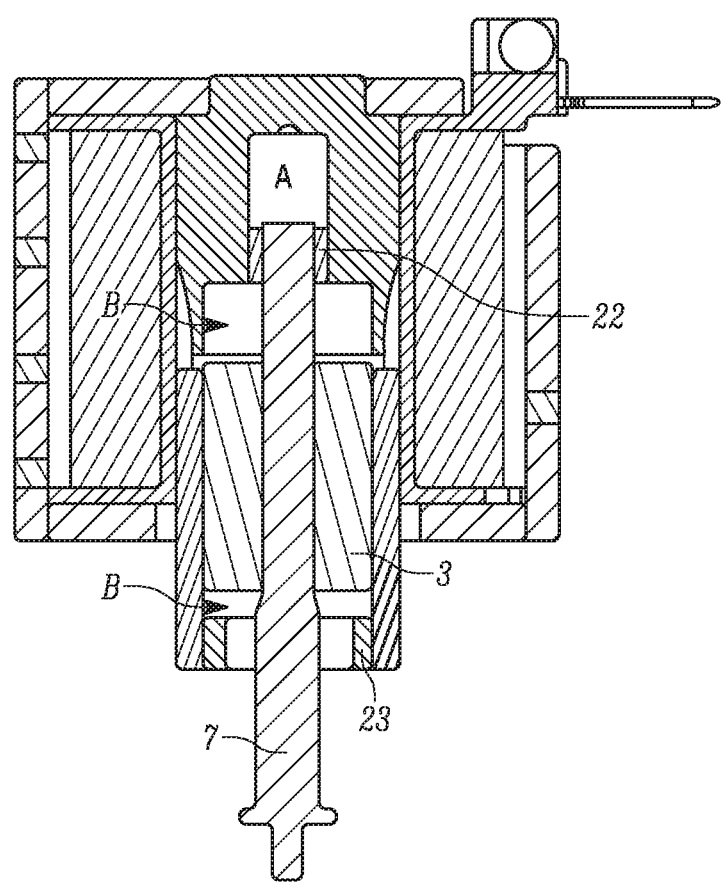
FIG. 4 shows schematically part of the electronic valve shown in FIG. 2.
Figure 5A:
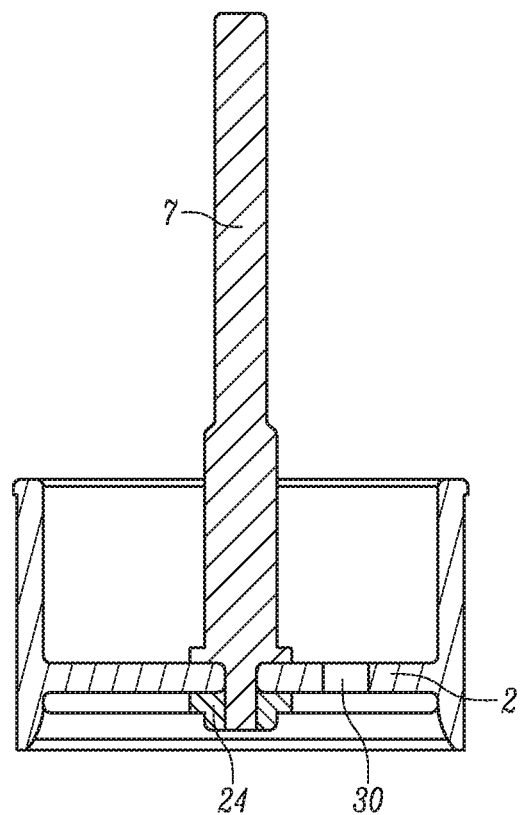
FIGS. 5A and 5B show schematically parts of the electronic valve shown in FIG. 2.
Figure 5B:
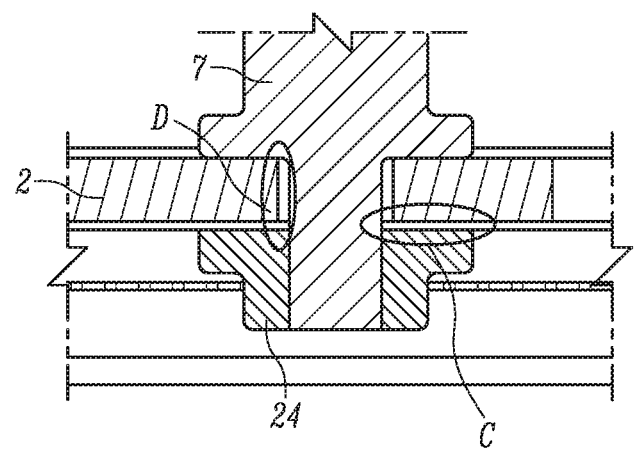

In order to explain the present invention more clearly, FIGS. 4, 5A and 5B are focused on showing different parts of the electronic valve shown in FIG. 2. FIG. 4 shows the connection of the armature 3 and the guide rod 7; it is clearly seen from FIGS. 2 and 4 that the two ends of the guide rod 7 slide in the upper bearing 22 and lower bearing 23, so that movement of the guide rod 7 in the vertical direction is achieved through the guiding effect of the upper bearing 22 and lower bearing 23. When energized, the coil 6 generates a magnetic field, driving the armature 3 to move, so that opening/closing of the valve is achieved by the guide rod 7 driving the valve head 2 to move. Since two bearings are used, the guide rod 7 is guided better. Preferably, the upper bearing 22 and lower bearing 23 may be made of copper-based powder metallurgical elements, so as to increase the precision and wear resistance of the components.

FIGS. 5A and 5B show the connection of the guide rod 7 and valve head 2. The guide rod 7 is connected to the valve head 2 by means of a fixing piece 24. The fixing piece 24 is connected in a fixed manner to the guide rod 7, for example by welding or an interference connection. It is seen from FIG. 5A that the valve head 2 may have a vent hole 30, to eliminate high pressure or vacuum generated by movement of the valve core. There may be one or more vent holes 30; it is seen from FIG. 3 that for example 3 vent holes 30 may be provided in the valve head 2. It is clearly seen from FIGS. 5A and 5B that a certain clearance (region C in FIG. 5B) is left between the valve head 2 and fixing piece 24 in the axial direction of the guide rod 7, while a certain clearance (region D in FIG. 5B) is left between the valve head 2 and guide rod 7 in the radial direction of the guide rod 7, thereby meeting the requirement for floatability of the valve head 2, i.e. enabling the valve head 2 to float left and right by a certain angle.

Figure 6A:
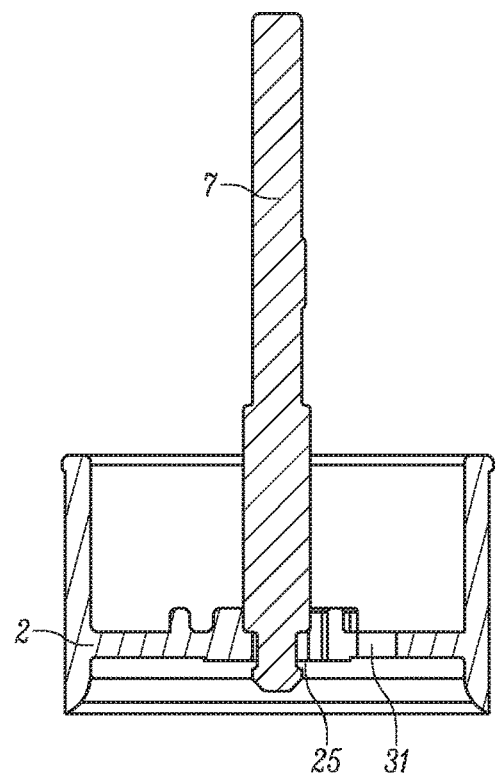
FIGS. 6A and 6B show schematically parts of an electronic valve according to another embodiment of the present invention.
Figure 6B:
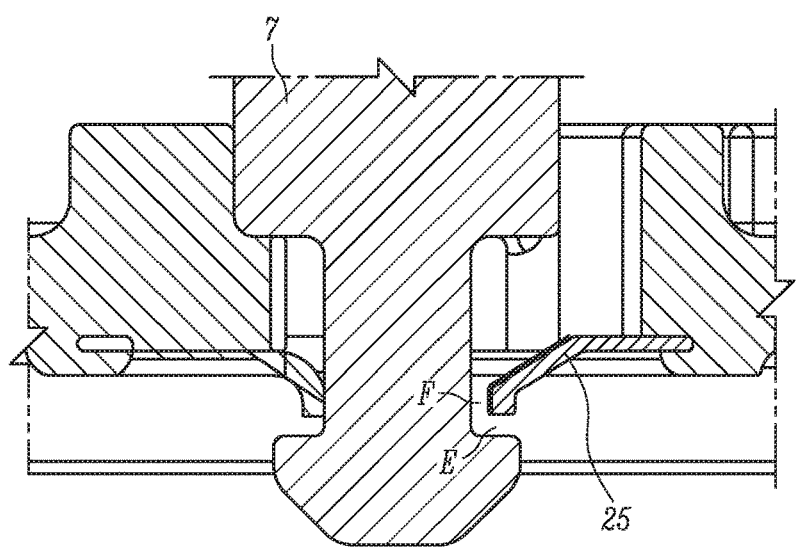
Figure 7:
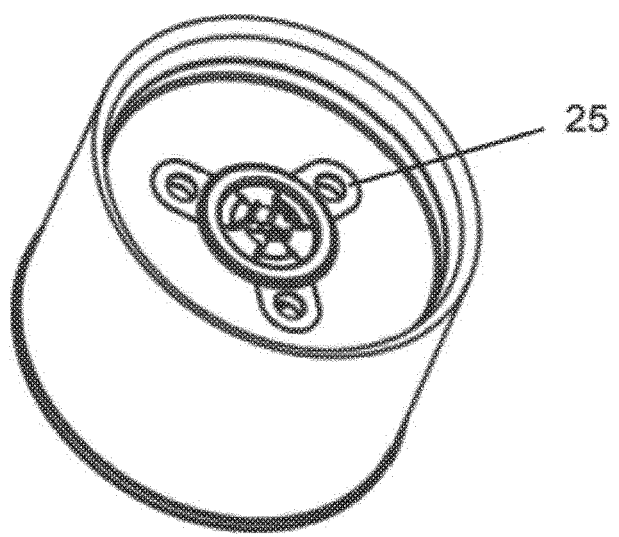
FIG. 7 shows schematically part of an electronic valve according to another embodiment of the present invention.

FIGS. 6A, 6B, and 7 show partial schematic diagrams of an electronic valve according to another embodiment of the present invention. It is seen from FIG. 6A that the valve head 2 may have a vent hole 31, to eliminate high pressure or vacuum generated by movement of the valve core. It is seen from FIGS. 6A, 6B and 7 that the guide rod 7 may be connected to the valve head 2 by means of a snap ring 25, with the snap ring 25 being injection molded in the valve head 2. It is seen from FIG. 6B that a certain clearance (region E and region F in FIG. 6B) is left between the snap ring 25 and guide rod 7 in both the axial direction of the guide rod 7 and the radial direction of the guide rod 7; the elasticity of the snap ring 25 and the clearances left between itself and the guide rod 7 meets the requirement for floatability of the valve head 2. Preferably, the snap ring 25 may be made of steel material, so as to be more wear resistant. Furthermore, the arrangement in which the snap ring 25 and valve head 2 are integrally injection molded may be employed, so as to increase component precision and make the assembly process simpler.

Figure 8A:
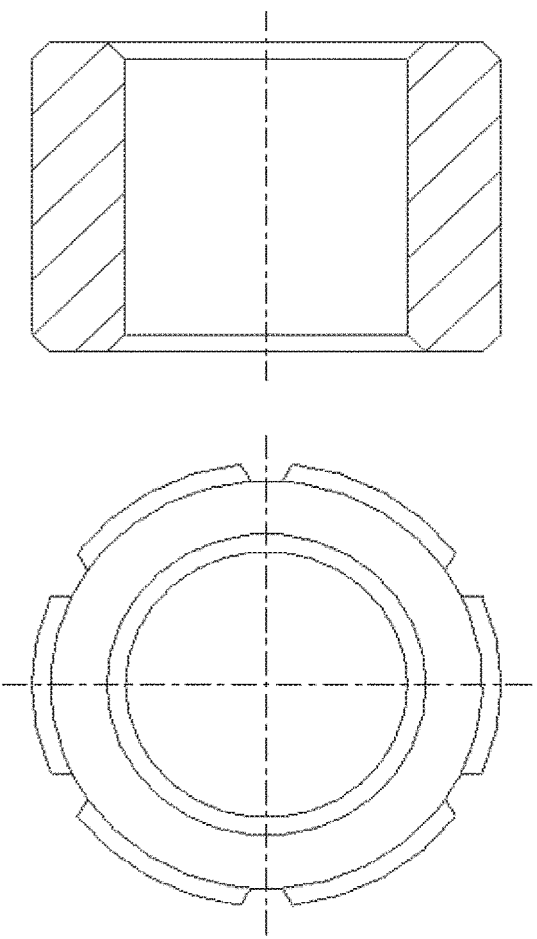
FIGS. 8A and 8B show upper bearings provided with grooves and with vent holes, respectively, in an electronic valve according to an embodiment of the present invention.
Figure 8B:
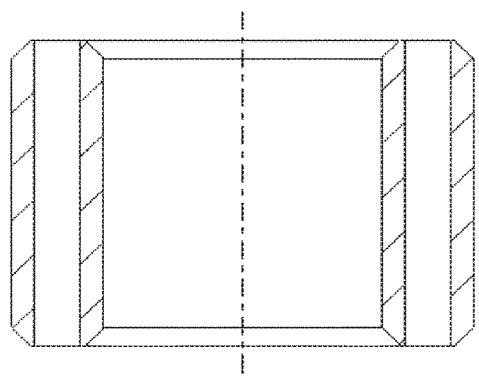
Figure 8B:
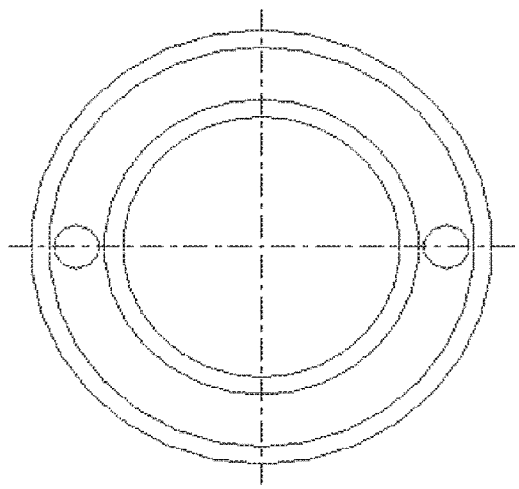
Figure 9A:
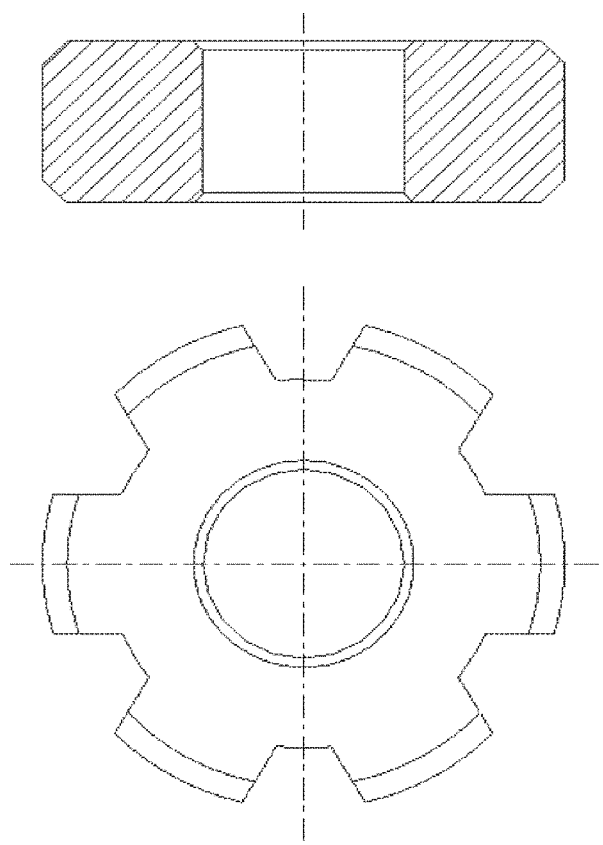
FIGS. 9A and 9B show lower bearings provided with grooves and with vent holes, respectively, in an electronic valve according to an embodiment of the present invention.
Figure 9B:
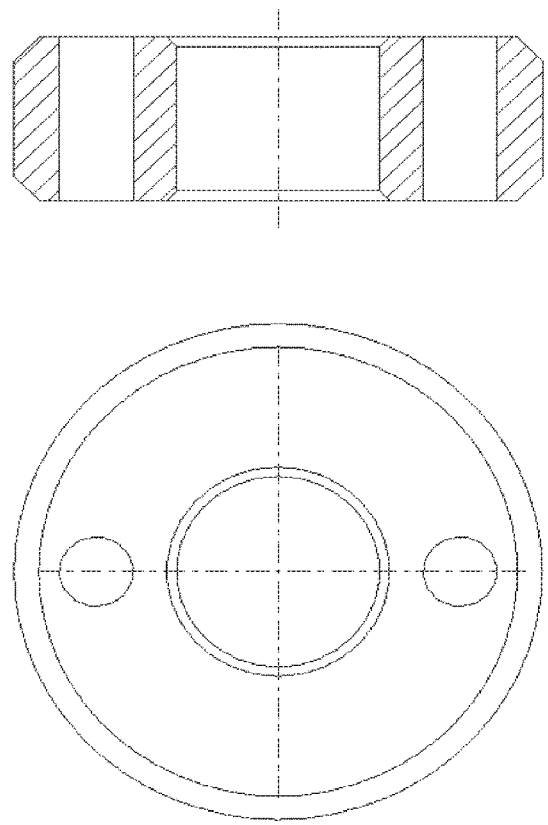

In the present invention, as FIG. 4 shows, during upward/downward movement of the guide rod 7 with the armature 3, two air cavities form at positions A and B of the electronic valve. Due to the movement of the guide rod 7 and armature 3, high pressure or vacuum arises in these two cavities, thereby causing hysteresis and slow opening/closing of the valve body. To eliminate such an adverse effect, preferably, grooves or vent holes may be provided in the upper bearing 22 and lower bearing 23. For example, FIGS. 8A and 8B show upper bearings provided with grooves and with vent holes, respectively, while FIGS. 9A and 9B show lower bearings provided with grooves and with vent holes, respectively. Those skilled in the art may understand that the shape and size of the grooves or vent holes is set according to specific requirements, in order to optimally eliminate high pressure or vacuum generated by movement of the valve core. Preferably, grooves may be provided in the upper bearing and lower bearing by a direct forming method. Furthermore, the provision of grooves or vent holes in the bearings also helps to lower element weight and save costs.

When the electronic valve 1 is powered off, the valve head 2 presses down on a valve seat (not shown) under the action of gravity and the elastic component 4, thereby closing the gas pathway. When the electronic valve 1 is energized, a magnetic circuit is formed by the upper stator 10, lower stator 11 and armature 3; under the action of the electromagnetic force generated by the coil 6, the armature 3 moves upwards, in turn driving the valve head 2 to move up by means of the guide rod 7, causing the electronic valve 1 to open and thereby opening the gas pathway.

Although the present invention has been disclosed above by way of preferred embodiments, the present invention is not limited to this. Changes and amendments of all kinds, made without departing from the spirit and scope of the present invention by any person skilled in the art, should be included in the scope of protection of the present invention. Therefore the scope defined by the claims should be regarded as the scope of protection of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An electronic valve, comprising:
   a valve head;
   at least one vent hole integrally formed as part of the valve head;
   an armature, the valve head and the armature being connected to each other by means of a guide rod;
   an upper stator;
   a lower stator;
   an upper bearing for guiding the guide rod;
   a lower bearing for guiding the guide rod;
   an elastic component for biasing the valve head;
   a sleeve surrounding the periphery of the armature;
   a bobbin which at least partially surrounds the sleeve; and
   a coil wound on the bobbin;
   a fixing piece, wherein the guide rod is connected to the valve head by means of the fixing piece, the fixing piece being connected in a fixed manner to the guide rod, such that a clearance is between the valve head and fixing piece in the axial direction of the guide rod, and a clearance is between the valve head and the guide rod in the radial direction of the guide rod.

2. The electronic valve of claim 1, wherein the guide rod and armature are joined together by means of an interference fit.

3. The electronic valve of claim 1, wherein the upper bearing is in interference connection with the upper stator, while the lower bearing is in interference connection with the sleeve.

4. The electronic valve of claim 1, wherein the upper bearing and the lower bearing are made of copper-based powder metallurgical elements.

5. The electronic valve of claim 1, wherein the sleeve is made of a magnetically permeable material.

6. The electronic valve of claim 1, further comprising:
   a groove provided in the upper bearing, to eliminate high pressure or vacuum generated by movement of the valve core; and
   a groove provided in the lower bearing, to eliminate high pressure or vacuum generated by movement of the valve core.

7. The electronic valve of claim 1, further comprising:
   a vent hole provided in the upper bearing, to eliminate high pressure or vacuum generated by movement of the valve core; and
   a vent hole provided in the lower bearing, to eliminate high pressure or vacuum generated by movement of the valve core.

8. The electronic valve of claim 1, further comprising:
   a groove provided in the lower bearing, to eliminate high pressure or vacuum generated by movement of the valve core; and
   a vent hole provided in the upper bearing, to eliminate high pressure or vacuum generated by movement of the valve core.

9. The electronic valve of claim 1, further comprising:
   a groove provided in the upper bearing, to eliminate high pressure or vacuum generated by movement of the valve core; and
   a vent hole provided in the lower bearing, to eliminate high pressure or vacuum generated by movement of the valve core.

10. The electronic valve of claim 1, the electronic valve further comprising an electronic component for absorbing pulse energy.

11. The electronic valve of claim 10, the electronic component for absorbing pulse energy further comprises a diode.

12. The electronic valve of claim 1, embodied as a compressed gas bypass valve of a turbocharged engine.

\* \* \* \* \*